(12) United States Patent
Tsuchiya et al.

(10) Patent No.: US 11,211,644 B2
(45) Date of Patent: Dec. 28, 2021

(54) VEHICLE BATTERY DEVICE WITH IMPROVED CURRENT DETECTION

(71) Applicant: KEIHIN CORPORATION, Tokyo (JP)

(72) Inventors: Shingo Tsuchiya, Utsunomiya (JP); Seiji Kamata, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 139 days.

(21) Appl. No.: 16/295,478

(22) Filed: Mar. 7, 2019

(65) Prior Publication Data

US 2019/0305385 A1 Oct. 3, 2019

(30) Foreign Application Priority Data

Mar. 28, 2018 (JP) .............................. JP2018-062443

(51) Int. Cl.

| | |
|---|---|
| H02J 7/00 | (2006.01) |
| H01M 10/48 | (2006.01) |
| H01M 10/46 | (2006.01) |
| H02J 7/02 | (2016.01) |
| B60L 50/64 | (2019.01) |
| B60L 53/62 | (2019.01) |
| B60L 58/10 | (2019.01) |
| H01M 50/20 | (2021.01) |

(52) U.S. Cl.
CPC .......... *H01M 10/482* (2013.01); *B60L 50/64* (2019.02); *B60L 53/62* (2019.02); *B60L 58/10* (2019.02); *H01M 10/46* (2013.01); *H01M 50/20* (2021.01); *H02J 7/0021* (2013.01); *H02J 7/0024* (2013.01); *H02J 7/022* (2013.01); *H01M 2220/20* (2013.01)

(58) Field of Classification Search
CPC .................................................. H01M 10/482
USPC ......................................................... 320/109
See application file for complete search history.

(56) References Cited

U.S. PATENT DOCUMENTS

| | | | |
|---|---|---|---|
| 6,268,710 B1 * | 7/2001 | Koga | H02J 7/0021 320/116 |
| 10,230,249 B2 * | 3/2019 | Ozawa | H01M 10/441 |
| 2013/0175857 A1 * | 7/2013 | Shreevani | B60L 3/0046 307/9.1 |
| 2015/0175026 A1 * | 6/2015 | Uyeki | H02J 7/0021 320/109 |

(Continued)

FOREIGN PATENT DOCUMENTS

| | | |
|---|---|---|
| JP | H05236608 A | 9/1993 |
| JP | 2008067500 A | 3/2008 |
| JP | 2010172062 | 8/2010 |

OTHER PUBLICATIONS

JPO Notice of Reasons for Rejection for corresponding JP Application No. 2018-062443; dated Nov. 2, 2021.

*Primary Examiner* — Yalkew Fantu
(74) *Attorney, Agent, or Firm* — Cantor Colburn LLP (57) ABSTRACT

A vehicle battery device includes a plurality of battery cell groups in which battery cells are connected in series, connection switches which can switch an electrical connection between the plurality of battery cell groups to a series connection or a parallel connection, and current sensors which detect electric currents flowing in the respective battery cell groups in both of the series connection and the parallel connection, and the current sensor is provided in the vicinity of a positive electrode terminal or a negative electrode terminal of each of the battery cell groups.

8 Claims, 4 Drawing Sheets

(56) References Cited

U.S. PATENT DOCUMENTS

| | | | |
|---|---|---|---|
| 2015/0236529 A1* | 8/2015 | Tanaka | B60L 15/2009 |
| | | | 320/109 |
| 2017/0120772 A1* | 5/2017 | Alser | H02J 7/0019 |
| 2017/0274775 A1* | 9/2017 | Kamata | H01M 10/486 |

* cited by examiner

VEHICLE BATTERY DEVICE WITH IMPROVED CURRENT DETECTION

CROSS-REFERENCE TO RELATED APPLICATION

The present invention claims priority under 35 U.S.C. § 119 to Japanese Patent Application No. 2018-062443, filed on Mar. 28, 2018, the entire contents of which are incorporated herein by reference.

BACKGROUND

Technical Field

The present invention relates to a vehicle battery device.

Description of Related Art

Patent Document 1 below discloses a power conversion device which has a plurality of battery cell groups and switches an electrical connection between the plurality of battery cell groups to a series connection or a parallel connection.

[Patent Document 1] Japanese Unexamined Patent Application, First Publication No. 2008-067500

SUMMARY OF THE INVENTION

In order to calculate a state of charge (SOC) of each of the battery cell groups, or implement maintenance, inspection, etc., an electric current flowing through each of the battery cell groups is preferably detected in both series connection and parallel connection. However, Patent Document 1 discloses a method of connecting a plurality of battery cell groups in a serial state or a parallel state but neither suggests nor discloses how to detect the electric current of each of the battery cell groups in both series connection and parallel connection.

It is an object of one embodiment of the present invention to detect an electric current flowing in each of the battery cell groups regardless of whether the connection between the plurality of battery cell groups is a series connection or a parallel connection.

(1) One embodiment of the present invention is a vehicle battery device including a plurality of battery cell groups in which battery cells are connected in series, connection switches which can switch an electrical connection between the plurality of battery cell groups to a series connection or a parallel connection, and current sensors which detect electric currents flowing in the respective battery cell groups in both of the series connection and the parallel connection and is characterized in that the current sensor is provided in the vicinity of a positive electrode terminal or a negative electrode terminal of each of the battery cell groups.

(2) In the vehicular battery device of the above (1), each of the current sensors may be connected to a current path between the positive electrode terminal or the negative electrode terminal of each of the battery cell groups and the connection switches.

(3) In the vehicular battery device of the above (2), each of the current sensors may be connected between the positive electrode terminal or the negative electrode terminal and a branch point where the current path branches.

(4) The vehicle battery device according to any one of the above (1) to (3) may further include a charge control unit which connects the plurality of battery cell groups in series by controlling the connection switches to an ON state or an OFF state to charge each of the battery cell groups using electric power supplied from the outside. Also, the charge control unit may detect an electric current flowing in each of the battery cell groups connected in series on the basis of the electric currents detected by the respective current sensors in a state where the plurality of battery cell groups are connected in series.

(5) In the vehicle battery device of the above (4), the charge control unit may further include a failure determination unit which determines the presence or absence of a failure in each of the current sensors by comparing the electric currents detected by the respective current sensors in a state where the plurality of battery cell groups are connected in series.

In the one embodiment of the present invention, it is possible to detect the electric current flowing in each battery cell group regardless of whether the connection between the plurality of battery cell groups is a series connection or a parallel connection.

DETAILED DESCRIPTION OF THE INVENTION

Hereinafter, a vehicle battery device according to one embodiment of the present invention will be described with reference to the drawings.

Figure 1:
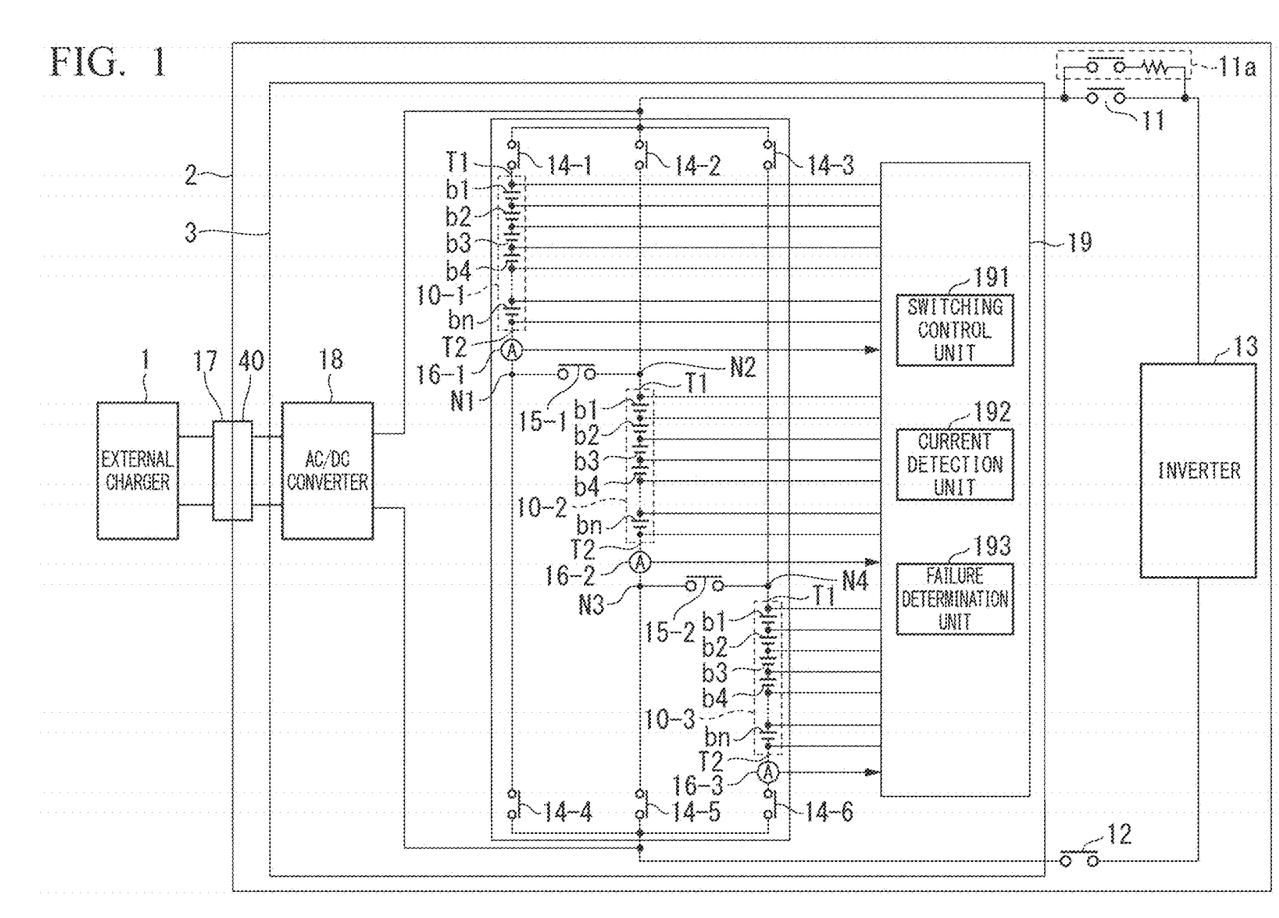
FIG. 1 is a diagram showing an example of a schematic configuration of a vehicle 2 on which a vehicle battery device 3 charged by an external charger 1 according to one embodiment of the present invention is mounted.

FIG. 1 is a diagram showing an example of a schematic configuration of a vehicle 2 on which a vehicle battery device 3 charged by an external charger 1 according to one embodiment of the present invention is mounted.

The external charger 1 is a device or equipment that charges (externally charges) a battery pack (battery) in the vehicle battery device 3 from the outside of the vehicle. The external charger 1 is, for example, a charging stand or a portable power supply. For example, the charging stand is installed in a commercial facility, a parking lot, or the like.

The vehicle 2 is, for example, a hybrid vehicle or an electric vehicle. The vehicle 2 includes the vehicle battery device 3, a first contactor 11, a precharge circuit 11a, a second contactor 12, an inverter 13, and a connector 40.

The vehicle battery device 3 includes a plurality of battery cell groups 10 (10-1 to 10-3), a plurality of parallel connection switches 14 (14-1 to 14-6), a plurality of series connection switches 15 (15-1 to 15-2), a plurality of current sensors 16 (16-1 to 16-3), an alternating current/direct current (AC/DC) converter 18, and a charge control unit 19. The battery pack mounted on the vehicle 2 includes the plurality of battery cell groups 10. The parallel connection switch 14 and the series connection switch 15 are an example of the "connection switch" of the present invention.

In each battery cell group 10, n battery cells b1 to bn are connected in series. In each battery cell group 10, the positive electrode terminal of the battery cell b1 (the uppermost cell) positioned at the earliest upstream position is the positive electrode terminal (one output terminal) T1 of the battery cell group 10. In each battery cell group 10, the negative electrode terminal of the battery cell bn (the lowermost cell) positioned at the latest downstream position is the negative electrode terminal (the other output terminal) T2 of the battery cell group 10. The above "n" is a natural number of two or more. Although a case where the vehicle battery device 3 includes three battery cell groups 10 will be described in the present embodiment, the present invention is not limited thereto and the number is not particularly limited as long as it is plural.

The first contactor 11 has a first contact connected to the positive electrode terminal of the battery pack and a second contact connected to a first input terminal of the inverter 13. The first contactor 11 changes to an open state that electrically connects the first contact and the second contact or changes to a closed state that releases the electrical connection between the first contact and the second contact in accordance with control from the charge control unit 19. For example, the first contactor 11 is an energization switch. The precharge circuit 11a is connected in parallel to the first contactor 11.

The second contactor 12 has a first contact connected to the negative electrode terminal of the battery pack and a second contact connected to a second input terminal of the inverter 13. The second contactor 12 changes to an open state that electrically connects the first contact and the second contact or changes to a closed state that releases the electrical connection between the first contact and the second contact in accordance with control from the charge control unit 19. For example, the second contactor 12 is an energization switch.

The inverter 13 has the first input terminal and the second input terminal. The inverter 13 converts DC power of the battery pack input to the first input terminal and the second input terminal into AC power and outputs the converted AC power to a load (for example, a traction motor) in the vehicle.

The parallel connection switch 14 is connected between the first contact of the first contactor 11 and the first contact of the second contactor 12. The parallel connection switch 14 is a switch that can connect the plurality of battery cell groups 10 in parallel (parallel connection).

Particularly, the parallel connection switch 14-1 has a first terminal connected to the first contact of the first contactor 11 and a second terminal connected to the positive electrode terminal T1 of the battery cell group 10-1. The parallel connection switch 14-2 has a first terminal connected to the first contact of the first contactor 11 and a second terminal connected to the positive electrode terminal T1 of the battery cell group 10-2. The parallel connection switch 14-3 has a first terminal connected to the first contact of the first contactor 11 and a second terminal connected to the positive electrode terminal T1 of the battery cell group 10-3.

The parallel connection switch 14-4 has a first terminal connected to the negative electrode terminal T2 of the battery cell group 10-1 and a second terminal connected to the first contact of the second contactor 12. The parallel connection switch 14-5 has a first terminal connected to the negative electrode terminal T2 of the battery cell group 10-2 and a second terminal connected to the first contact of the second contactor 12. The parallel connection switch 14-6 has a first terminal connected to the negative electrode terminal T2 of the battery cell group 10-3 and a second terminal connected to the first contact of the second contactor 12.

The series connection switch 15 is connected between the first contact of the first contactor 11 and the first contact of the second contactor 12. The series connection switch 15 is a switch that can serially connect the plurality of battery cell groups 10 (series connection).

Specifically, the series connection switch 15-1 has a first terminal connected to the negative electrode terminal T2 of the battery cell group 10-1 and a second terminal connected to the positive electrode terminal T1 of the battery cell group 10-2. The series connection switch 15-2 has a first terminal connected to the negative electrode terminal T2 of the battery cell group 10-2 and a second terminal connected to the positive electrode terminal T1 of the battery cell group 10-3.

The current sensors 16 (16-1 to 16-3) are provided for each of the battery cell groups 10-1 to 10-3. The current sensors 16 (16-1 to 16-3) detect current values flowing through the respective battery cell groups 10-1 to 10-3 whichever the electrical connection between the battery cell groups 10-1 to 10-3 is the series connection and the parallel connection. For example, the current sensor 16 may be a shunt resistor. Also, the current sensor 16 may include a Hall element, a current transformer or the like.

Each of the current sensors 16-1 to 16-3 is provided in the vicinity of the positive electrode terminal T1 or the negative electrode terminal T2 of the corresponding battery cell group 10-1 to 10-3.

The current sensor 16-1 detects a current value $I_1$ flowing in the battery cell group 10-1. The current sensor 16-1 is connected between the negative electrode terminal T2 of the battery cell group 10-1 and the first terminal of the series connection switch 15-1. The current sensor 16-1 outputs a detected current value $I_1$ to the charge control unit 19.

For example, the current sensor 16-1 is connected between the negative electrode terminal T2 of the battery cell group 10-1 and a connection point N1 between the first terminal of the parallel connection switch 14-4 and the first terminal of the series connection switch 15-1. However, the current sensor 16-1 may be connected between the positive electrode terminal T1 of the battery cell group 10-1 and the second terminal of the parallel connection switch 14-1.

Here, for example, the positive electrode terminals T1 of each battery cell group 10 and the parallel connection switches 14-1 to 14-3 are electrically connected using a wiring member such as a bus bar or a cable. For example, the negative electrode terminals T2 of each battery cell group 10 and the parallel connection switches 14-4 to 14-6 are electrically connected using a wiring member such as a bus bar or a cable. For example, the negative electrode terminal T2 of the battery cell group 10-1 and the series connection switch 15-1 are electrically connected using a wiring member such as a bus bar or a cable. For example, the positive electrode terminal T1 of the battery cell group 10-2 and the series connection switch 15-1 are electrically connected using a wiring member such as a bus bar or a cable. For example, the negative electrode terminal T2 of the battery cell group 10-2 and the series connection switch 15-2 are electrically connected using a wiring member such as a bus bar or a cable. For example, the positive electrode terminal T1 of the battery cell group 10-3 and the series connection switch 15-2 are electrically connected using a wiring member such as a bus bar or a cable. Therefore, when the current sensor 16-1 is provided in the vicinity of the positive electrode terminal T1 of the battery cell group 10-1, the current sensor 16-1 may be provided in a wiring member between the positive electrode terminal T1 of the battery cell group 10-1 and the second terminal of the parallel connection switch 14-1. However, a current path may branch into a plurality of paths by wiring between the wiring member and a component (not shown) such as a switch which is different from the parallel connection switch 14-1. In this case, the current sensor 16-1 may be connected to the current path between a branch point of a wiring from the positive electrode terminal T1 of the battery cell group 10-1 toward the second terminal of the parallel connection switch 14-1 and the positive electrode terminal T1 of the battery cell group 10-1. For example, in a wiring member that electrically connects between the positive electrode terminal T1 of the battery cell group 10-1 and the second terminal of the parallel connection switch 14-1, the current sensor 16-1 may be connected between a branch point of the wiring member and the positive electrode terminal T1 of the battery cell group 10-1. When there are a plurality of branch points, the current sensor 16-1 may be connected between a branch point closest to the positive electrode terminal T1 of the battery cell group 10-1 and the positive electrode terminal T1 of the battery cell group 10-1 among the plurality of branch points of a wiring member that electrically connects between the positive electrode terminal T1 of the battery cell group 10-1 and the second terminal of the parallel connection switch 14-1.

The current sensor 16-1 provided between the branch point and the battery cell group 10-1 can also be provided to the negative electrode terminal T2 of the battery cell group 10-1 in the same manner. The current sensor 16-1 of the present embodiment may be provided in the vicinity of the negative electrode terminal T2 of the battery cell group 10-1. In this case, the current sensor 16-1 is connected to a current path between a branch point (for example, the connection point N1) of a wiring from the negative electrode terminal T2 of the battery cell group 10-1 toward the first terminal of the series connection switch 15-1 and the negative electrode terminal T2 of the battery cell group 10-1.

The current sensor 16-2 detects a current value $I_2$ flowing in the battery cell group 10-2. The current sensor 16-2 is connected between the negative electrode terminal T2 of the battery cell group 10-2 and the first terminal of the series connection switch 15-2. The current sensor 16-2 outputs a detected current value $I_2$ to the charge control unit 19.

For example, the current sensor 16-2 is connected between the negative electrode terminal T2 of the battery cell group 10-2 and a connection point N3 between the first terminal of the parallel connection switch 14-5 and the first terminal of the series connection switch 15-2. However, the current sensor 16-2 may be connected between the positive electrode terminal T1 of the battery cell group 10-2 and the second terminal of the series connection switch 15-1.

For example, when the current sensor 16-2 is provided in the vicinity of the positive electrode terminal T1 of the battery cell group 10-2, the current sensor 16-2 is connected to a current path between a branch point of a wiring from the positive electrode terminal T1 of the battery cell group 10-2 toward the second terminal of the series connection switch 15-1 and the positive electrode terminal T1 of the battery cell group 10-2. The branch point is, for example, a connection point N2 between the positive electrode terminal T1 of the battery cell group 10-2 and the second terminal of the series connection switch 15-1.

When the current sensor 16-2 of the present embodiment is provided in the vicinity of the negative electrode terminal T2 of the battery cell group 10-2, the current sensor 16-2 may be connected to a current path between a branch point (for example, the connection point N3) of a wiring from the negative electrode terminal T2 of the battery cell group 10-2 toward the first terminal of the series connection switch 15-2 and the negative electrode terminal T2 of the battery cell group 10-2.

The current sensor 16-3 detects a current value $I_3$ flowing through the battery cell group 10-3. The current sensor 16-3 is connected between the negative electrode terminal T2 of the battery cell group 10-3 and the first terminal of the parallel connection switch 14-6. However, the current sensor 16-3 may be connected between the positive electrode terminal T1 of the battery cell group 10-3 and the second terminal of the series connection switch 15-2. The current sensor 16-3 outputs a detected current value $I_3$ to the charge control unit 19.

For example, when the current sensor 16-3 is provided in the vicinity of the positive electrode terminal T1 of the battery cell group 10-3, the current sensor 16-3 may be connected to a current path between a branch point of a wiring from the positive electrode terminal T1 of the battery cell group 10-3 toward the second terminal of the series connection switch 15-2 and the positive electrode terminal T1 of the battery cell group 10-3. The branch point is, for example, a connection point N4 between the positive electrode terminal T1 of the battery cell group 10-3 and the second terminal of the series connection switch 15-2.

The connector 40 connects the vehicle battery device 3 to the external charger 1. The connector 40 is connected to a charging plug 17 of the external charger 1 to connect the external charger 1 and the vehicle battery device 3.

The AC/DC converter 18 converts AC power supplied from the external charger 1 via the charging plug 17 into DC power. The AC/DC converter 18 supplies a converted DC power to the first terminals of the parallel connection switches 14-1 to 14-3.

The charge control unit 19 controls external charging from the external charger 1 to the battery cell groups 10-1 to 10-3. Hereinafter, the charge control unit 19 according to the present embodiment will be described.

The charge control unit 19 includes a switching control unit 191, a current detection unit 192, and a failure determination unit 193.

The switching control unit 191 controls each of the parallel connection switches 14-1 to 14-6 and the series connection switches 15-1 and 15-2 to be in an ON state or an OFF state so that the plurality of battery cell groups 10-1 to 10-3 are connected in parallel or in series.

For example, the switching control unit 191 controls the parallel connection switches 14-1 and 14-6 and the series connection switches 15-1 and 15-2 to be in an ON state and controls the parallel connection switches 14-2 to 14-5 to be in an OFF state, thereby connecting the plurality of battery cell groups 10-1 to 10-3 in series. The switching control unit 191 controls the parallel connection switches 14-1 to 14-6 to be in an ON state and controls the series connection switches 15-1 and 15-2 to be in an OFF state, thereby connecting the plurality of battery cell groups 10-1 to 10-3 in parallel. When the battery cell groups 10-1 to 10-3 are externally charged, the switching control unit 191 connects the plurality of battery cell groups 10-1 to 10-3 in series.

When the plurality of battery cell groups 10-1 to 10-3 are connected in series, the current detection unit 192 detects a current value Is flowing in each of the battery cell groups 10-1 to 10-3 connected in series based on the current values $I_1$ to $I_3$ detected by the current sensors 16-1 to 16-3. As a result, variations in the detection values of the current sensors 16-1 to 16-3 are reduced and the relative accuracy of the current value $I_s$ is improved. In this case, since the battery cell groups 10-1 to 10-3 are connected in series, the current values of the current $I_s$ flowing through each of the battery cell groups 10-1 to 10-3 are the same. The charge control unit 19 may calculate a state of charge (SOC: charged state) of each of the battery cell groups 10-1 to 10-3 based on the current $I_s$.

As a method of detecting the current $I_s$ detected by the current detection unit 192, for example, in a case where a plurality of battery cell groups 10-1 to 10-3 are connected in series, the current detection unit 192 calculates an average value of the current values $I_1$ to $I_3$ detected by the current sensors 16-1 to 16-3 and detects the calculated average value as the current value $I_s$. However, the method of detecting the current Is according to the present embodiment is not limited to the averaging method, and any method may be used as long as the relative accuracy of the current value $I_s$ can be improved. For example, the current detection unit 192 may detect a median value of the current values $I_1$ to $I_3$ as the current value $I_s$.

The failure determination unit 193 executes a failure determination processing for determining the presence or absence of a failure in each of the current sensors 16-1 to 16-3 by comparing the current values $I_1$ to $I_3$ detected by the current sensors 16-1 to 16-3 in a state where the plurality of battery cell groups 10-1 to 10-3 are connected in series. For example, the failure determination unit 193 compares the current values $I_1$ to $I_3$ with each other using the principle of majority decision, and determines the current sensor 16, which has detected a small number of current values as a comparison result, as a failure. For example, if one of the current values $I_1$ to $I_3$ is different from the other plurality of current values, the failure determination unit 193 determines that a failure has occurred in the current sensor 16 that has detected the current value.

Figure 2:
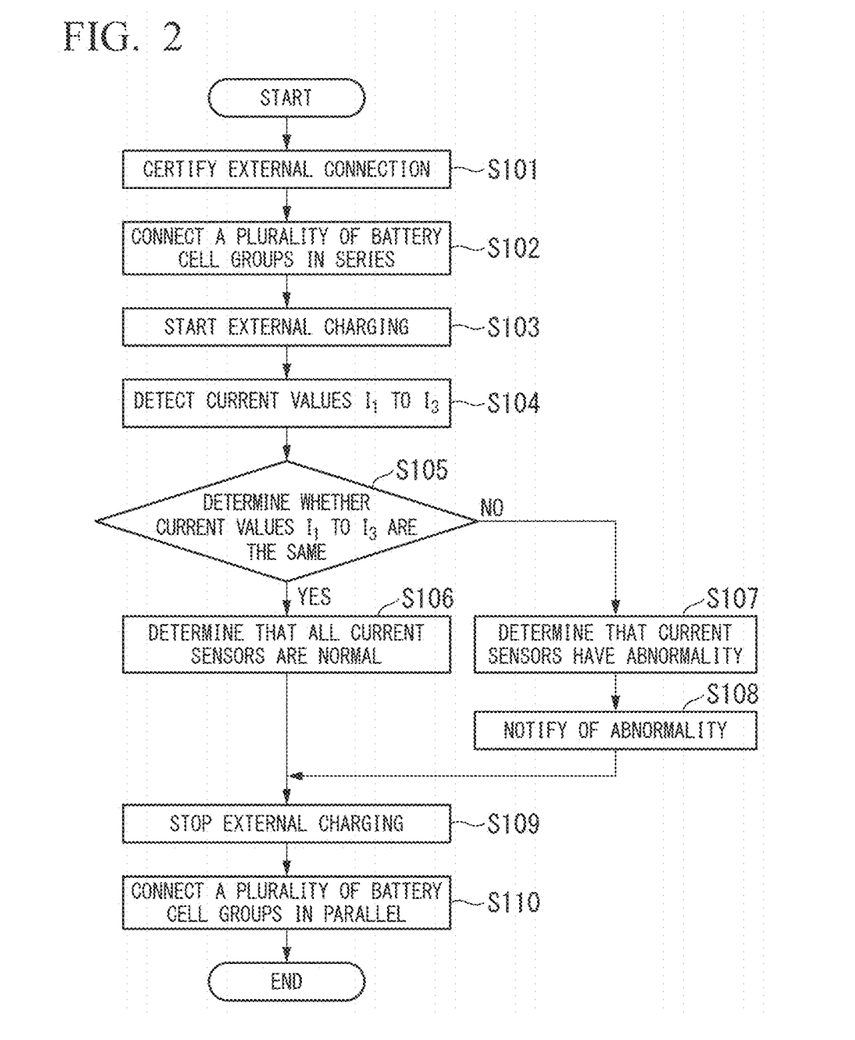
FIG. 2 is a flowchart of a failure determination processing according to one embodiment of the present invention.
Figure 3:
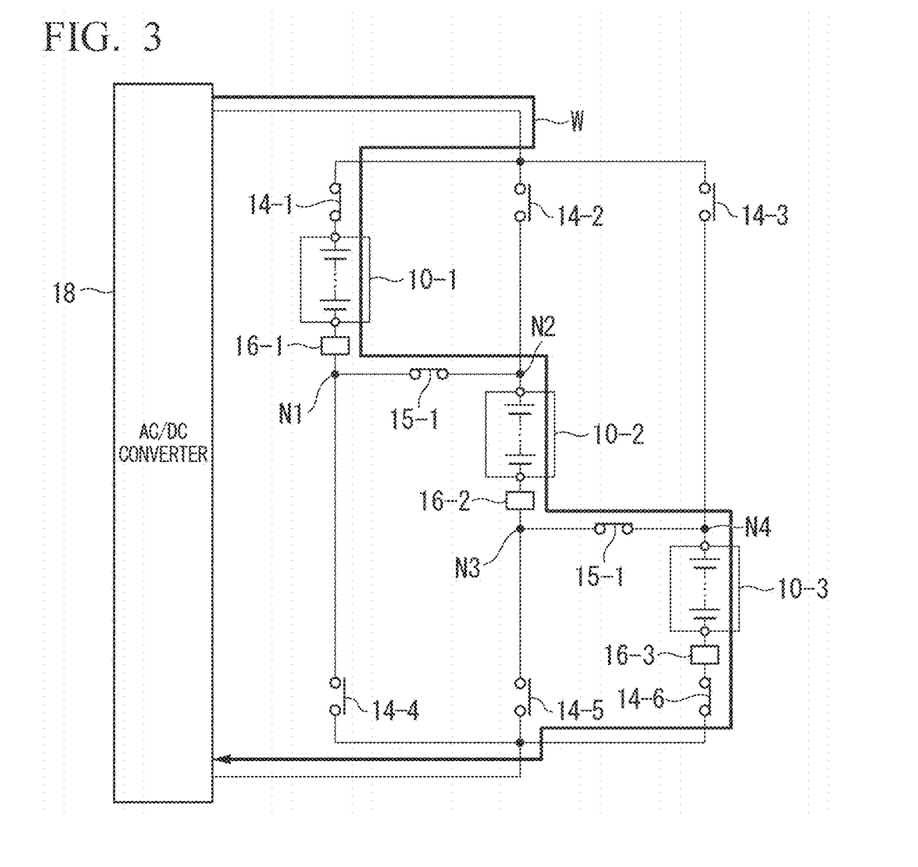
FIG. 3 is a diagram showing a state in which a plurality of battery cell groups 10-1 to 10-3 according to one embodiment of the present invention are connected in series.

Next, a failure determination processing according to the present embodiment will be described with reference to FIG. 2 and FIG. 3. In the following description, a case where the failure determination unit 193 executes the failure determination processing during external charging will be described.

When externally charging a plurality of battery cell groups 10-1 to 10-3, a user connects the charging plug 17 of the external charger 1 to the connector 40 of the vehicle 2. Thus, the charge control unit 19 can communicate with the external charger 1 through controller area network (CAN) communication or the like. Therefore, the charge control unit 19 communicates with the external charger 1, thereby detecting the external connection which is the connection of the charging plug 17 to the vehicle 2. As a result, the charge control unit 19 certifies the external connection (step S101).

When detecting the external connection, the charge control unit 19 controls the parallel connection switches 14-1 and 14-6 and the series connection switches 15-1 and 15-2 to be in an ON state, and controls the parallel connection switches 14-2 to 14-5 to be in an OFF state to connect the plurality of battery cell groups 10-1 to 10-3 in series (step S102). When the plurality of battery cell groups 10-1 to 10-3 are connected in series, the charge control unit 19 starts external charging (step S103).

When external charging is started, an electric power supplied from the external charger 1 to the vehicle 2 is converted into direct current by the AC/DC converter 18 and supplied to the plurality of battery cell groups 10-1 to 10-3. More specifically, as shown in FIG. 3, when external charging is started, a charging current flows in a current path W passing through the parallel connection switch 14-1, the battery cell group 10-1, the connection point N1, the series connection switch 15-1, the connection point N2, the battery cell group 10-2, the connection point N3, the series connection switch 15-2, the connection point N4, the battery cell group 10-3, and the parallel connection switch 14-6 in this order.

Here, since the current sensors 16-1 to 16-3 are provided in the current path W, the current sensors 16-1 to 16-3 respectively detect current values $I_1$ to $I_3$ during external charging (step S104). Then, the current sensors 16-1 to 16-3 respectively output the detected current values $I_1$ to $I_3$ to the charge control unit 19.

When the current values $I_1$ to $I_3$ are acquired from the current sensors 16-1 to 16-3 during external charging, the failure determination unit 193 determines the presence or absence of a failure in the current sensors 16-1 to 16-3 based on the current values $I_1$ to $I_3$.

Here, if each of the current sensors 16-1 to 16-3 has not failed, each of the current values $I_1$ to $I_3$ has the same value and indicates the current value $I_s$ (the current value of the charging current in the present embodiment). However, if one of the current sensors 16-1 to 16-3 has failed, the current value detected by the failed current sensor 16 has a value different from the current value detected by the two other current sensors 16. Therefore, the failure determination unit 193 determines whether or not all of the current values $I_1$ to $I_3$ are the same value (step S105). If they are all the same, all the current sensors 16-1 to 16-3 are determined to be normal (Step S106). On the other hand, when the current values $I_1$ to $I_3$ are not determined to be the same value, the failure determination unit 193 determines that an abnormality has occurred in any of the current sensors 16-1 to 16-3 (step S107). Further, by applying the principle of majority decision, the failure determination unit 193 determines that the current sensor 16 that has detected a small current value among the current values $I_1$ to $I_3$ has failed. That is, the failure determination unit 193 determines that the current sensor 16 that has detected a current value different from other current values among the current values $I_1$ to $I_3$ has failed.

When any one of the current sensors 16-1 to 16-3 is determined to have an abnormality, the failure determination unit 193 sends a notification of such (step S108). This notification may be voice or display. This display may be an indication of occurrence of the abnormality shown in the display device, or it may be shining or turning on of a light emitting diode (LED).

When a full charge of the plurality of battery cell groups 10-1 to 10-3 is completed after completion of the failure determination processing by the failure determination unit 193, the charge control unit 19 stops external charging (step S109). After the external charging is stopped, the charge control unit 19 connects the plurality of battery cell groups 10-1 to 10-3 in parallel (step S110).

When the failure determination unit 193 determines that no failure has occurred in any of the current sensors 16-1 to 16-3, the current detection unit 192 may detect the current value $I_s$ (for example, the current value of the charging current) by averaging the current values $I_1$ to $I_3$ detected by the current sensors 16-1 to 16-3 during external charging.

Although the vehicle battery device 3 of the above-described embodiment performs external charging, external charging may not be performed. The vehicle battery device 3 may have a plurality of battery cell groups 10 and a configuration capable of switching between a parallel connection and a series connection of the plurality of battery cell groups 10 and may not perform external charging. For example, the vehicle battery device 3 may have a configuration capable of switching a plurality of battery cell groups 10 between a parallel connection and a series connection, may charge a plurality of battery cell groups 10 with generated electric power generated internally, and may discharge electric power of the plurality of battery cell groups 10. For example, the vehicle battery device 3 may include a configuration capable of switching between a plurality of battery cell groups 10 in a parallel connection and a series connection, and a plurality of current sensors 16 may be provided in the vicinity of the negative electrode terminal or the positive electrode terminal of each battery cell group 10. The external charging is not an indispensable configuration of the vehicle battery device 3.

Although the embodiments of the present invention have been described above in detail with reference to the drawings, the specific configuration is not limited to this embodiment, and designs and the like within the scope not deviating from the gist of the present invention are also included.

(Modification 1)

The vehicle battery device 3 of the above-described embodiment has three battery cell groups 10, but the number of battery cell groups is not particularly limited. The vehicle battery device 3 may have two or more battery cell groups 10. For example, when the number of battery cell groups 10 included in the vehicle battery device 3 is two, the failure determination unit 193 may perform failure determination processing by a method shown in FIG. 4 instead of by majority decision. Also, in the description of FIG. 4, for example, the vehicle battery device 3 is supposed to include two battery cell groups 10-1 and 10-2 and two current sensors 16-1 and 16-2.

Figure 4:
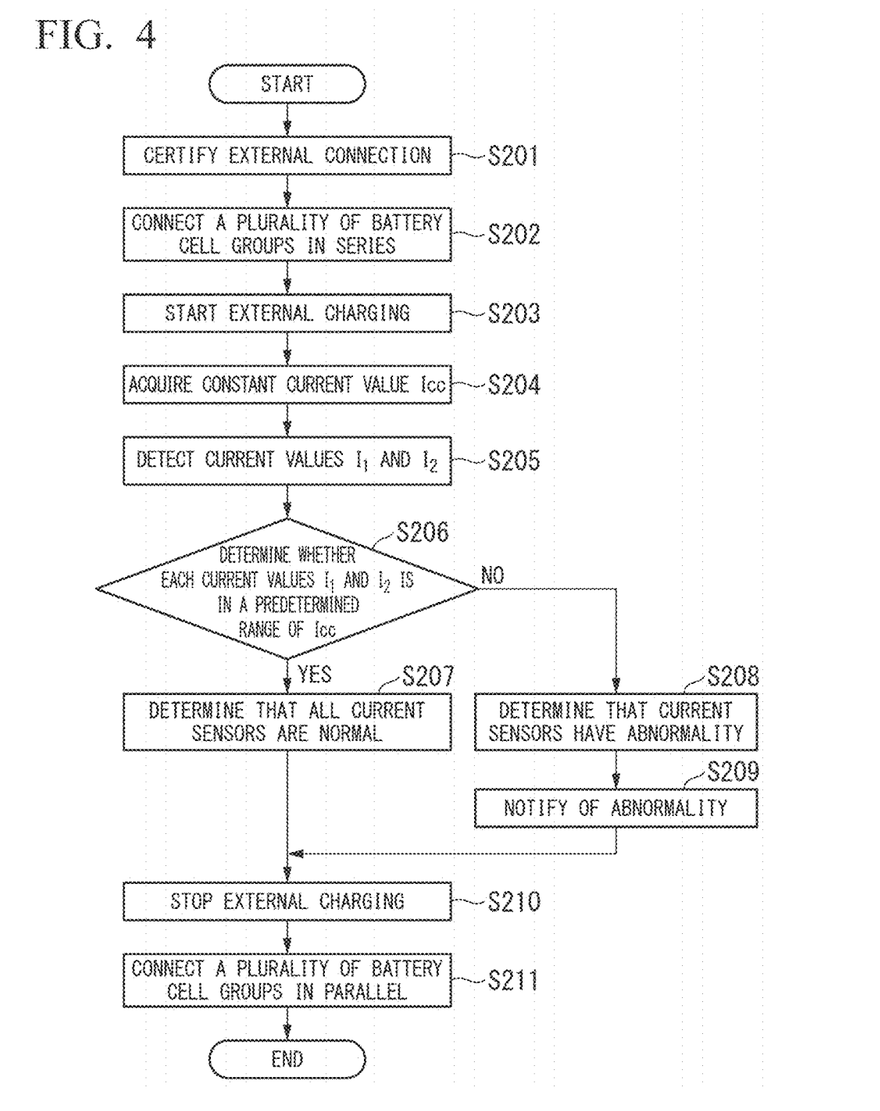
FIG. 4 is a flowchart of a modification of a failure determination processing according to one embodiment of the present invention.

As shown in FIG. 4, the charge control unit 19 communicates with the external charger 1 to detect the connection (external connection) of the charging plug 17 to the vehicle 2. As a result, the charge control unit 19 certifies the external connection (step S201). When the external connection is detected, the charge control unit 19 connects the plurality of battery cell groups 10-1 and 10-2 in series (step S202) and starts external charging (step S203).

This external charging is a constant current charging at the beginning and thereafter becomes a constant voltage charging. During the constant current charging, the charge control unit 19 communicates with the external charger 1 to acquire information of a constant current value $I_{cc}$ which is a current value of the charging current in the constant current charging from the external charger 1 (step S204). In addition, the current sensors 16-1 and 16-2 detect the current values $I_1$ and $I_2$ respectively during the constant current charging (step S205). Then, the current sensors 16-1 and 16-2 respectively output the current values $I_1$ and $I_2$ to the charge control unit 19.

When the current values $I_1$ and $I_2$ are acquired from the current sensors 16-1 and 16-2, the failure determination unit 193 determines whether or not the current sensors 16-1 and 16-2 have failed based on the constant current value $I_{cc}$ and the current values $I_1$ and $I_2$. For example, the failure determination unit 193 determines whether or not each of the current values $I_1$ and $I_2$ is within a predetermined range centered on the constant current value $I_{cc}$ (step S206). For example, the failure determination unit 193 determines whether or not each of the current values $I_1$ and $I_2$ is within ±5% of the constant current value $I_{cc}$. When it is determined that each of the current values $I_1$ and $I_2$ is within ±5% of the constant current value $I_{cc}$, the failure determination unit 193 determines that the current sensors 16-1 and 16-2 are normal (step S207). On the other hand, when it is determined that at least one of the current values $I_1$ and $I_2$ is a value other than ±5% of the constant current value $I_{cc}$, the failure determination unit 193 determines that the current sensor 16 that has detected the current value has an abnormality (step S208). If one or more current sensors 16 is determined to have an abnormality, the failure determination unit 193 sends the same notification as in step S108 (step S209).

Then, when the plurality of battery cell groups 10-1 and 10-2 are fully charged, the charge control unit 19 stops external charging (step S210). After the external charging is stopped, the charge control unit 19 connects the plurality of battery cell groups 10-1 and 10-2 in parallel (step S211).

(Modification 2)

The failure determination unit 193 of the above embodiment may not use the principle of majority decision for the failure determination processing. For example, the failure determination unit 193 may determine that the current sensor 16 has an abnormality when any one of the current values $I_1$ to $I_3$ exceeds a predetermined current value in consideration of variations in detection of the current sensor 16. For example, the failure determination unit 193 may calculate the difference between the current values $I_1$ to $I_3$ and may determine that the current sensor 16 has an abnormality when the value of the difference exceeds a threshold value in consideration of the variation in detection of the current sensor 16.

(Modification 3)

The charge control unit 19 of the above embodiment may obtain the SOC of each of the battery cell groups 10-1 to 10-3 from the current value $I_s$ obtained by averaging the current values $I_1$ to $I_3$. Further, when the SOC of each of the battery cell groups 10-1 to 10-3 varies over a predetermined range after the external charging is completed, the charge control unit 19 may control the battery cell groups 10-1 to 10-3 to not be switched from a series connection to a parallel connection. Therefore, when the SOC of each of the battery cell groups 10-1 to 10-3 varies over a predetermined range, the charge control unit 19 switches from a serial connection to a parallel connection after performing cell balance to equalize the storage capacities of the battery cell groups 10-1 to 10-3. In this manner, it is possible to suppress an inrush current from flowing to the battery cell groups 10-1 to 10-3.

As described above, the vehicle battery device 3 includes connection switches and current sensors 16-1 to 16-3. The connection switches switch the electrical connections between the plurality of battery cell groups 10-1 to 10-3 to a series connection or a parallel connection. The connection switches are the parallel connection switch 14 and the series connection switch 15. The current sensors 16-1 to 16-3 detect currents flowing through the respective battery cell groups 10 in both the series connection and the parallel connection. Each of the current sensors 16-1 to 16-3 is provided in the vicinity of the positive electrode terminal T1 or the negative electrode terminal T2 of each of the battery cell groups 10-1 to 10-3. For example, each of the current sensors 16-1 to 16-3 is provided in the immediate vicinity of the positive electrode terminal T1 or the negative electrode terminal T2 of each of the battery cell groups 10-1 to 10-3.

According to the above configuration, the vehicle battery device 3 can detect the current value $I_s$ flowing through each of the battery cell groups 10-1 to 10-3 regardless of whether the connection between the plurality of battery cell groups 10-1 to 10-3 is a serial connection or a parallel connection.

Also, for example, the current sensors 16-1 to 16-3 are provided in a current path between the positive electrode terminal T1 or the negative electrode terminal T2 of each battery cell group and the connection switch (for example, the series connection switch 15) as the vicinity. The current sensors 16-1 to 16-3 are connected between a branch point where the current path branches and the positive electrode terminal T1 or the negative electrode terminal T2.

In addition, the charge control unit 19 may detect the current value $I_s$ flowing in each battery cell group connected in series on the basis of the current values $I_1$ to $I_3$ detected by the current sensors 16-1 to 16-3 in a state where the plurality of battery cell groups 10-1 to 10-3 are connected in series. In this manner, variations in the detection of the current sensors 16-1 to 16-3 are reduced, and the relative accuracy of the current value $I_s$ is improved. As a result, the vehicle battery device 3 can improve the calculation accuracy of the SOC and extend a cruising distance of the vehicle.

Further, the charge control unit 19 may include a failure determination unit 193. The failure determination unit 193 may determine the presence or absence of a failure in each of the current sensors 16-1 to 16-3 by comparing the current values detected by the current sensors 16-1 to 16-3 in a state where the plurality of battery cell groups 10-1 to 10-3 are connected in series. As a result, the failure determination unit 193 can detect abnormality of each of the current sensors 16-1 to 16-3 with a simple configuration.

According to the vehicle battery device described above, it is possible to detect a current flowing in each battery cell group regardless of whether the connection between the plurality of battery cell groups is a series connection or a parallel connection.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 External charger
2 Vehicle
3 Vehicle battery device
10 Battery cell group
14 Parallel connection switch
15 Series connection switch
16 Current sensor
19 Charge control unit
191 Switching control unit
192 Current detection unit
193 Failure determination unit

What is claimed is:

1. A vehicle battery device for a vehicle including an inverter and first and second contactors, the vehicle battery device comprising:
   a plurality of battery cell groups in which battery cells are connected in series;
   connection switches configured to switch an electrical connection pattern among the plurality of battery cell groups between a series connection pattern and a parallel connection pattern;
   current sensors which detect electric currents flowing in the respective battery cell groups in both of the series connection pattern and the parallel connection pattern; and
   a charge control unit including a failure determination unit,
   wherein the current sensor is provided in the vicinity of a positive electrode terminal or a negative electrode terminal of each of the battery cell groups,
   the first contactor has a first contact connected to the positive electrode terminal of the battery pack and a second contact connected to a first input terminal of the inverter,
   the second contactor has a first contact connected to the negative electrode terminal of the battery pack and a second contact connected to a second input terminal of the inverter, and
   the failure determination unit determines presence or absence of a failure in each of the current sensors by comparing the electric currents detected by the respective current sensors in a state where the plurality of battery cell groups are connected in series.

2. The vehicular battery device according to claim 1, wherein each of the current sensors is connected to a current path between the positive electrode terminal or the negative electrode terminal of each of the battery cell groups and the connection switches.

3. The vehicular battery device according to claim 2, wherein each of the current sensors is connected between the positive electrode terminal or the negative electrode terminal and a branch point where the current path branches.

4. The vehicle battery device according to claim 1, wherein
   the charge control unit connects the plurality of battery cell groups in series by controlling the connection switches to an ON state or an OFF state to charge each of the battery cell groups using electric power supplied from the outside, and
   wherein the charge control unit detects an electric current flowing in each of the battery cell groups connected in series on the basis of the electric currents detected by the respective current sensors in a state where the plurality of battery cell groups are connected in series.

5. The vehicle battery device according to claim 2, wherein
   the charge control unit connects the plurality of battery cell groups in series by controlling the connection switches to an ON state or an OFF state to charge each of the battery cell groups using electric power supplied from the outside, and
   the charge control unit detects an electric current flowing in each of the battery cell groups connected in series on the basis of the electric current detected by the respective current sensors in a state where the plurality of battery cell groups are connected in series.

6. The vehicle battery device according to claim 3, wherein
   the charge control unit which connects the plurality of battery cell groups in series by controlling the connection switches to an ON state or an OFF state to charge each of the battery cell groups using electric power supplied from the outside, and
   the charge control unit detects an electric current flowing in each of the battery cell groups connected in series on the basis of the electric current detected by the respective current sensors in a state where the plurality of battery cell groups are connected in series.

7. The vehicle battery device according to claim 1, wherein a negative electrode terminal of one of the battery cell groups is connected via the connection switch to a positive electrode terminal of another of the battery cell groups.

8. The vehicle battery device according to claim 7, wherein the negative electrode terminal is connected via the current sensor to the connection switch.

* * * * *